Jan. 27, 1959     J. E. PATEMAN     2,871,347
ELECTRONIC AMPLIFYING CIRCUITS
Filed June 18, 1953
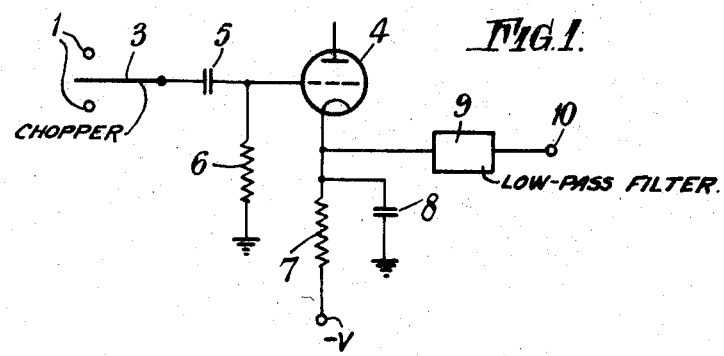
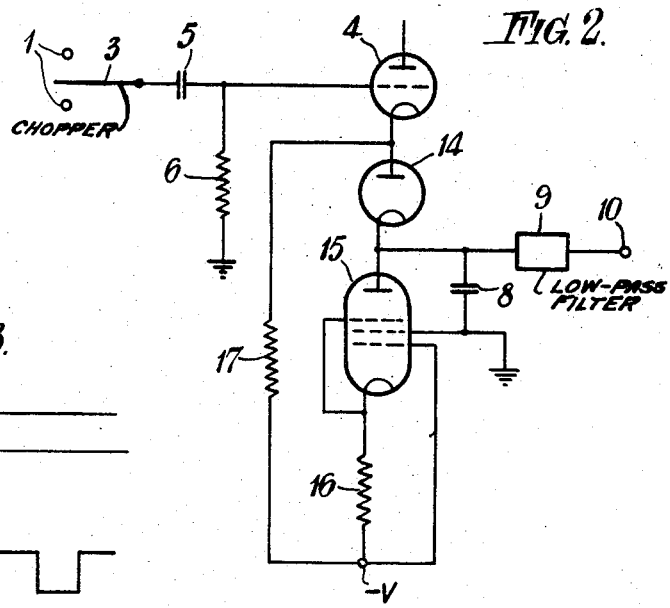
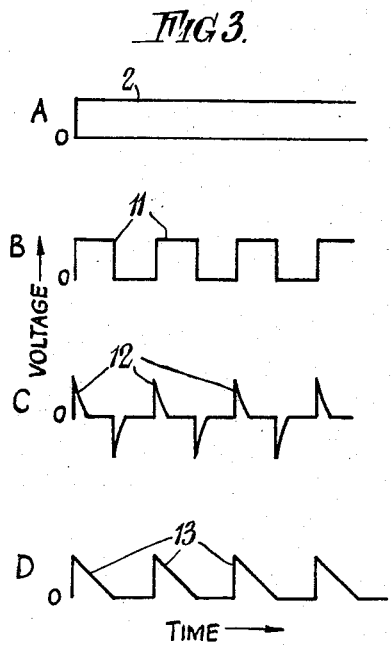

United States Patent Office 2,871,347
Patented Jan. 27, 1959

2,871,347

ELECTRONIC AMPLIFYING CIRCUITS

Jack Edward Pateman, Potters Bar, England, assignor to Elliott Brothers (London) Limited, London, England, a British company Application June 18, 1953, Serial No. 362,633

Claims priority, application Great Britain June 20, 1952

5 Claims. (Cl. 250—27)

This invention relates to electronic amplifying circuits, for example, for use in analogue computers, and has for its object to provide a simple thermionic valve amplifier circuit by means of which an output voltage can be obtained which is proportional to the square of an input voltage.

According to this invention an amplifier circuit comprises a thermionic valve, means for maintaining the anode thereof at a positive potential with respect to the cathode, a terminal at which an input voltage is applied, means for deriving from said voltage a train of voltage pulses of substantially square-topped waveform and of an amplitude equal to that of the input voltage, differentiating means connected between said means and the control grid of the valve and adapted to deliver to the latter alternating positive-going and negative-going voltage pulses of narrow peaked waveform and each of an amplitude equal to that of the square-topped pulse from which it derives, a condenser connected between the cathode of the valve and earth so that it will be charged to the peak value of the respective positive-going pulse each time that one of these appears at the grid of the valve, means permitting the charge on the condenser to leak away and arranged to ensure substantially linear discharge thereof, and means for deriving from the voltage waveform appearing across said condenser an output representing the mean D. C. level of this waveform.

Preferably, the input voltage is chopped to produce the square-topped pulses of an amplitude equal to that of the input voltage, the rate of chopping being much higher than any possible rate of variation of the input.

In order that the invention may be more clearly understood, two forms thereof will now be described by way of example, reference being made to the accompanying drawings in which:

Fig. 1 shows a circuit diagram of one arrangement,

Fig. 2 shows a circuit diagram of a modified arrangement, and

Figs. 3A, 3B, 3C and 3D illustrate the voltage/time waveforms appearing at various points in the circuits shown in Figs. 1 and 2.

The first arrangement illustrated in Fig. 1 comprises a pair of terminals 1, one of which is connected to earth, across which the input voltage indicated at 2 (Fig. 3A) is applied, and a chopper device indicated generally at 3 which alternately connects one or other of the terminals 1 to the control grid of a triode valve 4 through a condenser 5, the control grid of the valve 4 being connected to earth through a resistor 6. The anode of the valve 4 is connected to a source of H. T. potential in the usual way and the cathode of the valve 4 is connected by way of a resistor 7 to a source of negative potential indicated by —V the magnitude of which is large compared with that of the input signal 2. At the junction between the appropriate end of the resistor 7 and the cathode of the valve 4, there is connected the one plate of a condenser 8 the other plate of which is connected to earth. A filter 9 for extracting the mean D. C. level of the voltage waveform appearing across the condenser 8 is connected to the cathode of the valve 4 and to the one plate of the condenser 8, and supplies the output of the circuit to a terminal 10.

In the operation of this arrangement the input voltage 2 is chopped by the device 3 to produce the rectangular voltage pulses 11 (Fig. 3B) which are differentiated by the differentiating circuit constituted by the condenser 5 and resistor 6 to produce a voltage waveform of the character indicated at 12 (Fig. 3C) which is supplied to the grid of the valve 4. Although the voltage 2 is shown as being of constant amplitude it will be appreciated that it may be of varying amplitude and is not necessarily of positive polarity but may vary from positive to negative polarity and vice-versa, it being necessary that the rate of chopping by the device 3 should be much higher than any possible rate of variation of the input voltage 2. Whatever the polarity of the input voltage 2 and the consequent polarity of the rectangular pulses 11, the differentiating circuit will always produce a voltage waveform 12 which contains positive-going pulses. It will be understood that the narrow peaked pulses 12 will be of an amplitude equal to that of the input voltage 2 and that each positive-going pulse 12 supplied to the control grid of the valve 4 will cause the latter to conduct heavily and thus charge the condenser 8 to the peak value of the pulse 12. At the end of the positive-going pulse 12 the cathode of the valve 4 is unable to follow the grid thereof due to the charge remaining on the condenser 8 acting to cut off the valve 4. The condenser 8 therefore discharges through the resistor 7 until the valve 4 again conducts slightly. By arranging that the cathode lead is connected through the resistor 7 to the source of a negative potential —V which is large compared with the input signal 2, the discharge of the condenser 8 may be made substantially linear so that the waveform of each pulse 13 (Fig. 3D) of the voltage at the cathode of the valve 4 is a right-angled triangle having a constant slope of the hypotenuse. From this it follows that the length of the base of each triangle representing the voltage/time pulses 13 is proportional to the height thereof. Therefore, as the mean D. C. level of the waveform 13 at the cathode of the valve 4 is proportional to the area of the triangle, it is correspondingly proportional to the square of the height of the triangle, i. e. the peak amplitude of the pulse 13, which in turn, is equal to the magnitude of the input voltage 2. From this it will be seen that the mean D. C. level of the output from the circuit appearing at the terminal 10 is proportional to the square of the input. The mean D. C. level may be extracted by means of the low-pass filter 9 the cut-off frequency of which is less than one half of the chopping frequency.

It should be noted that the accuracy of the simple circuit briefly described above with reference to Figs. 1 and 3A, 3B, 3C and 3D is limited by two factors, namely, (1) the discharge of the condenser 8 connected to the cathode lead of the valve 4 will not be linear unless the negative potential —V applied to the cathode lead is of much greater magnitude than the input signal 2, and (2) the end portion of the discharge of the condenser 8 will not be linear due to the large grid base of the triode valve 4.

The modified circuit arrangement illustrated in Fig. 2 avoids these errors. In this modified arrangement the chopping device 3 and the differentiating circuit consisting of the condenser 5 and the resistor 6 are left unaltered but in place of the resistance 7 in the cathode lead of the triode 4 there are connected in series a diode 14 and a pentode 15 which acts as a constant current device, the diode 14 having its anode connected to the cathode of the triode 4 and its cathode connected to the anode of the pentode 15 and also to the one plate of the condenser 8. The suppressor grid and cathode of the pentode 15 are strapped together whereas the screening grid is connected to earth as is also the other plate of the condenser 8. Finally, the control grid of the pentode is connected to the source of the large negative potential —V which is also connected, by way of appropriate resistances 16 and 17, both to the cathode of the pentode 15 and to the cathode of the triode 4 respectively. It will be appreciated that the resistor 17 is of high value and that the current through the pentode 15 must be small in relation to the total current taken by the triode 4. The filter 9 is connected to the one plate of the condenser 8 and to the cathode of the diode 14. It should be noted that the filter 9 for extracting the mean D. C. level of the output from the circuit must be such that it imposes a negligible load on its source, that is to say that the only discharge path for the condenser 8 must be by way of the pentode valve 15.

The operation of the modified circuit arrangement illustrated in Fig. 2 will be understood from the foregoing description and is substantially the same as that described with reference to Fig. 1, the modification including the triode 14 and the pentode 15 only ensuring that the condenser 8 discharges linearly.

The means for chopping the input may be of any suitable character and for low chopping speeds may be constituted by a vibrating relay contact. Where much higher speeds of chopping are desired the chopping may be effected by means of electronic switches.

It will be appreciated that with the circuit arrangements described, the output 13 (Fig. 3D) will be independent of the sign of the input voltage 2 since each square-topped voltage wave 11 of the chopped input, when differentiated, will produce an extremely narrow voltage pulse or spike 12 which is either positive-going or negative-going followed by a similar narrow voltage pulse or spike which is negative-going or positive-going as the case may be. It is each positive-going voltage pulse which causes the cathode follower triode 4 to conduct heavily. Hence the same result is secured whether the input to the circuit be positive or negative.

It will be seen that with the aid of the circuit arrangements according to this invention, a voltage in analogue form which is directly proportional to the value of a given quantity may be caused to produce an output voltage which is also of analogue form but is proportional to the square of the value of the given quantity. Such circuit arrangements are therefore of considerable value in computing devices of the analogue type in which the values of the quantities to be operated upon are represented by corresponding voltages.

It will be appreciated that input/output characteristics other than square law may be obtained by permitting a non-linear discharge of the condenser and if the input/output relationship is expressed as output = (input)$^x$, all values of the exponent $x$ between 1 and 2 may be realised by arranging for a suitable non-linear discharge.

The operation of the circuit has been described in relation to the application under continuous input conditions. However, if the input is in pulse form the circuit illustrated in Fig. 1 or Fig. 2 may still be used by omitting the chopping device 3.

What I claim is:

1. An amplifier circuit comprising a thermionic valve having at least an anode, a cathode and a control grid electrode, a terminal at which an input voltage is applied, a chopper device for deriving from said input voltage a train of voltage pulses of substantially square-topped waveform and of an amplitude equal to that of said input voltage, differentiating means comprising a first condenser connected between said chopper device and said grid and a first resistor connected between said grid and earth, said differentiating means being adapted to deliver to said grid alternating positive-going and negative-going voltage pulses of narrow peaked waveform and each of an amplitude equal to that of the square-topped pulse from which it derives, means for maintaining said anode at a positive potential with respect to said cathode including a source of negative potential, the magnitude of which is large compared with the magnitude of said input voltage, and a second resistor connected between said cathode and said source, a second condenser connected between said cathode and earth so that it will be charged to the peak value of the respective positive-going pulse each time that one of these appears on the grid and will discharge linearly through said second resistor between the appearance of successive positive-going pulses at said grid and means for deriving from the voltage waveform appearing across said second condenser an output representing the mean direct current level of this waveform.

2. An amplifier circuit comprising a first thermionic valve having at least an anode, a cathode and a control grid electrode, a terminal at which an input voltage is applied, a chopper device for deriving from said input voltage a train of voltage pulses of substantially square-topped waveform and of an amplitude equal to that of said input voltage, differentiating means comprising a first condenser connected between said chopper device and said grid and a first resistor connected between said grid and earth, said differentiating means being adapted to deliver to said grid alternating positive-going and negative-going voltage pulses of narrow peaked waveform and each of an amplitude equal to that of the square-topped pulse from which it derives, means for maintaining said anode at a positive potential with respect to said cathode including a source of negative potential, the magnitude of which is large compared with the magnitude of said input voltage, and a second resistor connected between said cathode and said source, a second thermionic valve having at least an anode and a cathode, the anode of said second valve being connected to the cathode of said first valve, a third thermionic valve capable of passing a substantially constant current under fluctuating conditions and having at least an anode, a cathode, a suppressor grid, a screen grid and a control grid, the anode of said third valve being connected to the cathode of said second valve, the suppressor grid and cathode of said third valve being strapped together, the screen grid of said third valve being connected to earth, the control grid of said third valve being connected to said source and the cathode of said third valve being connected to said source through a third resistor, a second condenser connected on the one side to the cathode of said second valve and on the other side to earth so that it will be charged to the peak value of the respective positive-going pulse each time that one of these appears on the control grid of said first valve to cause said second valve to become conducting, and will discharge linearly through said third valve between the appearance of successive positive-going pulses at the grid of said first valve and means for deriving from the voltage waveform appearing across said second condenser an output representing the mean direct current level of this waveform.

3. An amplifier circuit comprising a thermionic valve having at least an anode, a cathode and a control grid electrode, a terminal at which is applied an input voltage capable of variation in amplitude, means for deriving from said input voltage a train of voltage pulses of substantially square-topped waveform and of an amplitude equal to that of said input voltage, differentiating means comprising a first condenser connected between said pulse-train deriving means and said grid and a first resistor conected between said grid and earth, said differentiating means being adapted to deliver to said grid alternating positive-going and negative-going voltage pulses of narrow peaked waveform and each of an amplitude equal to that of the square-topped pulse from which it derives, means for maintaining said anode at a positive potential with respect to said cathode including a source of negative potential, the magnitude of which is large compared with the magnitude of said input voltage, and resistance means connected between said cathode and said source, a second condenser conected between a point on said resistance means and earth so that it will be charged to the peak value of the respective positive-going pulse each time that one of these appears on the grid and will discharge linearly through said resistance means between the appearance of successive positive-going pulses at said grid and means for deriving from the voltage waveform appearing across said second condenser an output representing the mean direct current level of this waveform.

4. An amplifier circuit comprising a thermionic valve having at least an anode, a cathode and a control grid electrode, a terminal at which is applied an input voltage capable of variation in amplitude, a chopper device having a rate of chopping which is much higher than any possible rate of variation of said input voltage for deriving from said input voltage a train of voltage pulses of substanitially square-topped waveform and of an amplitude equal to that of said input voltage, differentiating means comprising a first condenser connected between said chopper device and said grid and a first resistor connected between said grid and earth, said differentiating means being adapted to deliver to said grid alternating positive-going and negative-going voltage pulses of narrow peaked waveform and each of an amplitude equal to that of the square-topped pulse from which it derives, means for maintaining said anode at a positive potential with respect to said cathode including a source of negative potential, the magnitude of which is large compared with the magnitude of said input voltage, and a second resistor connected between said cathode and said source, a second condenser connected between said cathode and earth so that it will be charged to the peak value of the respective positive-going pulse each time that one of these appears on the grid and will discharge linearly through said second resistor between the appearance of successive positive-going pulses at said grid and means for deriving from the voltage waveform appearing across said second condenser an output representing the mean direct current level of this waveform.

5. An amplifier circuit comprising a first thermionic valve having at least an anode, a cathode and a control grid electrode, a terminal at which is applied an input voltage capable of variation in amplitude, a chopper device having a rate of chopping which is much higher than any possible rate of variation of said input voltage for deriving from said input voltage a train of voltage pulses of substantially square-topped waveform and of an amplitude equal to that of said input voltage, differentiating means comprising a first condenser connected between said chopper device and said grid and a first resistor connected between said grid and earth, said differentiating means being adapted to deliver to said grid alternating positive-going and negative-going voltage pulses of narrow peaked waveform and each of an amplitude equal to that of the square-topped pulse from which it derives, means for maintaining said anode at a positive potential with respect to said cathode including a source of negative potential, the magnitude of which is large compared with the magnitude of said input voltage, and a second resistor connected between said cathode and said source, a second thermionic valve having at least an anode and a cathode, the anode of said second valve being connected to the cathode of said first valve, a third thermionic valve capable of passing a substantially constant current under fluctuating conditions and having at least an anode, a cathode, a suppressor grid, a screen grid and a control grid, the anode of said third valve being connected to the cathode of said second valve, the suppressor grid and cathode of said third valve being strapped together, the screen grid of said third valve being connected to earth, the control grid of said third valve being connected to said source and the cathode of said third valve being connected to said source through a third resistor, a second condenser connected on the one side to the cathode of said second valve and on the other side to earth so that it will be charged to the peak value of the respective positive-going pulse each time that one of these appears on the control grid of said first valve to cause said second valve to become conducting, and will discharge linearly through said third valve between the appearance of successive positive-going pulses at the grid of said first valve and means for deriving from the voltage waveform appearing across said second condenser an output representing the mean direct current level of this waveform.

References Cited in the file of this patent

UNITED STATES PATENTS

| | | |
|---|---|---|
| 2,455,373 | Lester | Dec. 7, 1948 |
| 2,463,969 | Hulst | Mar. 8, 1949 |
| 2,467,775 | Posthumus | Apr. 19, 1949 |
| 2,575,904 | Bischoff | Nov. 20, 1951 |
| 2,621,263 | Scoles | Dec. 9, 1952 |
| 2,626,980 | Balde et al. | Jan. 27, 1953 |
| 2,632,886 | Barney | Mar. 24, 1953 |
| 2,633,528 | Hutson | Mar. 31, 1953 |
| 2,662,113 | Schouten et al. | Dec. 8, 1953 |
| 2,699,498 | Guenther | Jan. 11, 1955 |

FOREIGN PATENTS

| | | |
|---|---|---|
| 650,472 | Great Britain | Feb. 28, 1951 |